United States Patent
Mintonye, II

(10) Patent No.: US 6,336,542 B1
(45) Date of Patent: Jan. 8, 2002

(54) UNIDIRECTIONAL CONVEYOR ROLLER

(76) Inventor: Edwin Arthur Mintonye, II, 98 S. Clover La., Harrisburg, PA (US) 17112

( * ) Notice: Subject to any disclaimer, the term of this patent is extended or adjusted under 35 U.S.C. 154(b) by 0 days.

(21) Appl. No.: 09/260,691

(22) Filed: Mar. 2, 1999

Related U.S. Application Data

(60) Provisional application No. 60/076,421, filed on Mar. 2, 1998.

(51) Int. Cl.[7] .............................................. B65G 13/00
(52) U.S. Cl. ........................................ 193/37; 193/35 A
(58) Field of Search ................................ 193/35 A, 37; 198/779, 370.09

(56) References Cited

U.S. PATENT DOCUMENTS

| | | |
|---|---|---|
| 1,821,618 A | 9/1931 | Crowley |
| 3,209,880 A | 10/1965 | Dietiker |
| 3,312,320 A | 4/1967 | Froio |
| 3,576,242 A * | 4/1971 | Mumma ...................... 193/35 |
| 3,606,938 A * | 9/1971 | Heyne ....................... 188/82.1 |
| 3,696,912 A * | 10/1972 | Fleischauer et al. ........ 198/127 |
| 3,713,521 A * | 1/1973 | Moritake ..................... 193/37 |
| 3,789,960 A * | 2/1974 | Warren ......................... 188/74 |
| 3,899,063 A * | 8/1975 | Pollard ..................... 193/35 A |
| 3,918,561 A * | 11/1975 | Isacsson ....................... 193/35 |
| 4,000,796 A * | 1/1977 | Bolton et al. ............. 193/35 A |
| 4,266,659 A | 5/1981 | Meyer et al. ................ 198/781 |
| 4,344,218 A * | 8/1982 | Hooper et al. ................ 29/516 |
| 4,488,638 A * | 12/1984 | Morgan et al. ............. 198/781 |
| 4,577,747 A * | 3/1986 | Martin ....................... 198/500 |
| 4,600,093 A * | 7/1986 | Adams ..................... 193/35 A |
| 4,606,659 A * | 8/1986 | Hogan ......................... 384/518 |
| 4,723,646 A * | 2/1988 | Scheneman, Jr. .......... 193/35 A |
| 4,864,704 A * | 9/1989 | Hogan et al. .................. 29/119 |
| 5,035,314 A * | 7/1991 | Kornylak ...................... 193/37 |
| 5,048,661 A * | 9/1991 | Toye ........................ 193/35 R |
| 5,086,903 A * | 2/1992 | Agnoff ..................... 193/35 A |
| 5,147,020 A * | 9/1992 | Scherman et al. ......... 193/35 A |
| 5,186,270 A * | 2/1993 | West .......................... 180/6.62 |
| 5,217,099 A * | 6/1993 | Marcus et al. ................ 193/37 |
| 5,375,689 A * | 12/1994 | Sapp et al. ................ 193/35 A |
| 5,421,442 A * | 6/1995 | Agnoff ......................... 193/37 |
| 5,478,190 A * | 12/1995 | Helton ........................ 414/530 |
| 5,524,740 A * | 6/1996 | Conley ......................... 193/37 |
| 5,642,799 A * | 7/1997 | Warrilow ................... 193/35 A |
| 5,642,800 A * | 7/1997 | East ............................. 193/37 |
| 5,678,676 A * | 10/1997 | Peirson ........................ 193/37 |
| 5,722,888 A * | 3/1998 | Lane ........................... 460/114 |
| 6,053,298 A * | 9/1998 | Nimmo et al. ................ 193/37 |
| 5,857,554 A * | 1/1999 | Toye ........................ 193/35 R |
| 5,865,290 A * | 2/1999 | Scott ............................ 193/37 |
| 5,875,878 A * | 3/1999 | Peirson ........................ 193/37 |
| 5,944,161 A * | 8/1999 | Sealey .......................... 193/37 |
| 6,016,900 A * | 1/2000 | Longrod ....................... 193/37 |
| 6,076,647 A * | 1/2000 | Agnoff ......................... 193/37 |

* cited by examiner

Primary Examiner—Christopher P. Ellis
Assistant Examiner—Rashmi Sharma
(74) Attorney, Agent, or Firm—Mills Law Firm PLLC

(57) ABSTRACT

A unidirectional conveyor roller for use in a pre-existing conveyor roller system includes a cylindrical roller body supported on a shaft by ball bearing assemblies. A roller clutch bearing between the roller body and the shaft limits relative rotation to a single direction. An internal spring mechanism allows the shaft to be temporarily retracted for facilitating installation on the conveyor roller system.

6 Claims, 2 Drawing Sheets

UNIDIRECTIONAL CONVEYOR ROLLER

CROSS-REFERENCE TO RELATED APPLICATION

This Application claims the benefit under 35 U.S.C. 119(e) of U.S. Provisional Patent Application No. 60/076,421 filed Mar. 2, 1998 by Edwin Arthur Mintonye, II for One Way Roller.

BACKGROUND OF INVENTION

1. Field of Invention

The present invention relates to conveyor roller systems and, more particularly, to a conveyor roller designed to permit rotation in only one direction.

Various breaking mechanisms for controlling the rotational movement of conveyor rollers are well known to those skilled in the art. In the materials handling industry it is desirable to control the rotational movement of a conveyor roller in order to limit the movement of articles and packages being carried thereon to one direction.

For example, U.S. Pat. No. 3,918,561 discloses a brake roller for conveyor systems wherein a tube rotates about a stationary shaft and a speed multiplying transmission within the tube powered by the rotation of the tube operates centrifugally operated friction brake members to prevent an excessive rate of tube rotation. Similarly, U.S. Pat. No. 5,147,020 discloses a conveyor roller brake that is carried within the confines of a conveyor roller.

However, such conveyor brake mechanisms are mechanically complex requiring numerous component parts and a high cost of manufacture. Thus, the Unidirectional Conveyor Roller of the present invention has been developed to provide a cost effective mechanism for controlling rotation of the conveyor roller to a single direction.

2. Description of Related Prior Art

U.S. Pat. No. 3,918,561 to Sven E. Isacsson discloses a brake roller for conveyor systems wherein a tube rotates about a stationary shaft and a speed multiplying transmission within the tube powered by the rotation of the tube operates centrifugally operated friction brake members to prevent an excess rate of tube rotation. Positive drive means are interposed between the tube and the transmission and the friction brake members centrifugally operated are constructed as to make the most efficient use of the centrifugal forces available.

U.S. Pat. No. 5,147,020 to Dale Scherman et al. discloses a conveyor roller brake that is preferably carried within confines of a conveyor roller and includes a friction surface carried by the conveyor roller and a brake shoe that is maintained continuously in biased engagement with the friction surface and is selectively engagable or disengagable with respect to a non-rotatable hub element thereby selectively permitting the brake shoe to rotate freely with the conveyor roller in frictional engagement with the friction surface or to be arrested in its rotation so that relative rotation of the roller with respect thereto provides continuous roller braking through frictional sliding of the brake shoe in biased engagement with the friction surface.

U.S. Pat. No. 3,899,063 to Orray R. Pollard discloses a roller mechanism associated with roller conveyor systems for controlling buildup of momentum of such systems during use. In this system, a hammer is mounted within one or more substantially cylindrical rollers on the axes thereof. Anvils are positioned on the roller to rotate therewith and to engage the hammer. The hammer is capable of pivotally disengaging the anvils to allow resisted rotational motion of the rollers.

U.S. Pat. No. 3,576,242 to Harold H. Mumma discloses a gravity roller conveyor including special braking rollers at spaced intervals which have stationary brake drum attachments adjacent to one of their ends. A pair of brake shoes located within each of the brake drums is pivotally mounted to and rotatable with each braking roller. As the speed of the conveyor rollers increases under a moving load, the centrifugal force acting upon the brake shoes propels them outwardly against the urging of their springs and into engagement with the braking surface of the drum in order to retard speed.

U.S. Pat. No. 4,266,659 to Louis H. Meyer et al. discloses an accumulating roller conveyor for conveying articles having a frame and a plurality of conveyor rollers each conveyor roller including a cylindrical drive sleeve supported by longitudinal shaft extending therethrough and rotatably supporting the drive sleeve thereon. This roller conveyor features a one-way clutch mechanism being engagable between each conveyor roller shaft and the associated conveyor roller sleeve to cause the shaft and the sleeve to rotate as a unit to hold out of contact with the drive belt the conveyor rollers in contact with a stopped article as long as the contact article is stopped.

U.S. Pat. No. 3,209,880 to Gilbert Dietiker discloses a cargo handling apparatus with an automatic braking mechanism for slowing down and/or stopping runaway cargo. An automatic speed control cargo roller is provided for use in a floor recess. The roller has a belt operated mechanism capable of stopping rotation of the roller when a predetermined speed is achieved. The stopped roller activates a brake shoe member to engage itself with the load thereby preventing the load from further movement.

U.S. Pat. No. 3,312,320 to Nicholas J. Froilo discloses a conveyor braking roller including a speed retarding roller for advancing packages and pallets automatically from a loading position to an unloading position without application of propelling power. This device utilizes a complex gearing system and does not limit rotation to only one direction.

Finally, U.S. Pat. No. 1,821,618 to Joseph P.Crowley discloses an apparatus for the manufacture of sheet glass which features an overrunning clutch. In the event that the linear speed of a glass sheet exceeds the peripheral speed of the conveyor rollers, the sheet is allowed to drive the rollers faster than they are positively driven along the conveyor. When this occurs, the overrunning clutch is actuated and the glass sheet rides freely over the conveyor rollers.

SUMMARY OF THE INVENTION

The present unidirectional conveyor roller or One Way Roller, as it has become known in the industry, consists of a cylindrical metal tube having conventional ball bearing assemblies installed at either end thereof. An elongated shaft extends through the pair of ball bearing assemblies and through the hollow tube projecting a short distance at either end thereby permitting rotation of the tube about the shaft in the manner of a conventional conveyor roller.

The One Way Roller of the present invention also includes a roller clutch bearing which is installed on the shaft and carried on the interior of the hollow tube to limit rotation to one direction only.

In the present One Way Roller the shaft is retractable into the roller body at one end to permit convenient installation into the supporting frame of the conveyor system.

In view of the above, it is an object of the present invention to provide a conveyor roller, which permits rotation in only one direction to control the movement of articles being conveyed thereon.

Another object of the present invention is to provide a unidirectional conveyor roller which can be conveniently installed in a pre-existing conveyor system to limit the movement of packages conveyed thereon to one direction.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
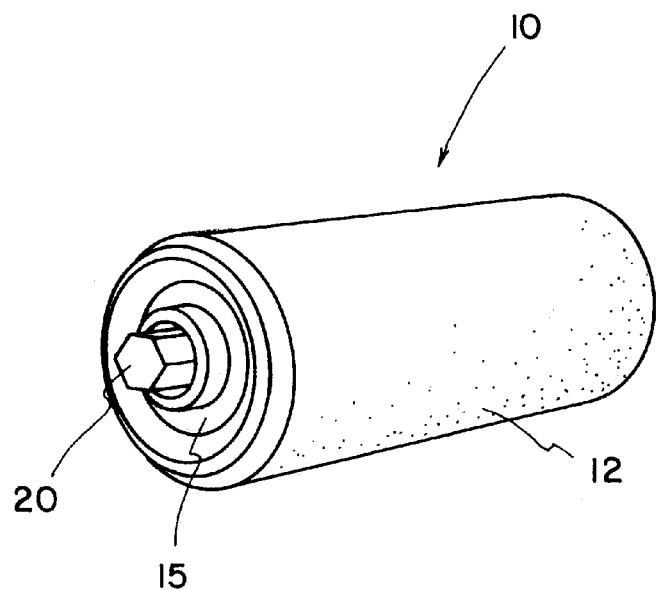
FIG. 1 is a perspective view showing the unidirectional conveyor roller of the present invention.

With further reference to the drawings, there is shown therein a unidirectional conveyor roller in accordance with the present invention, indicated generally at 10 and illustrated in FIG. 1. The present roller 10 includes a hollow cylindrical body member 12 having counterbored openings formed at either end thereof.

In the preferred embodiment the cylindrical body member 12 is constructed of any suitable material such as formed steel tubing or other material having properties suitable for this application.

Figure 2:
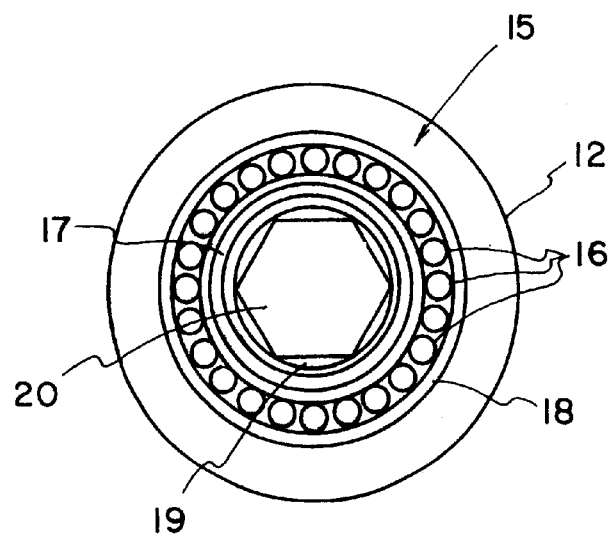
FIG. 2 is a side elevational view of the unidirectional conveyor roller showing the bearing assembly radially disposed about a hexagonal shaft.

A bearing assembly, indicated generally at 15, is installed at either counterbored end to an interference fit condition as shown in FIG. 2. The bearing assemblies 15 are positioned flush with the end of the tubular body member 12 extending approximately ½ inch into the same from either end.

Each bearing assembly 15 includes a plurality of ball bearings 16 which are enclosed in a circular race 17 that is disposed within a retaining ring 18 being radially disposed about the bearings 16 in a conventional manner.

The inner race 17 is provided with a central opening 19 having a predetermined shape and diameter depending upon the intended application.

In the preferred embodiment an elongated, hexagonal shaft 20 extends through the tubular body member 12 and slideably penetrates the opening 19 in either bearing assembly 15 extending a pre-determined distance from either end such that the body member 12 rotates freely about the longitudinal axis of the shaft 20.

The shaft 20 is preferably formed from hexagonal steel stock of a suitable hardness and tensile strength to support the particular application for the conveyor roller 10.

Of course, the cross-sectional shape of the shaft 20 may be varied for a particular application. For example, the shaft 20 may be circular or square in cross-section if desired. In these alternative configurations the openings 19 in the respective bearing assemblies 15 are modified to match the cross-section of a particular shaft.

In any case the size of the openings 19 in the bearing assemblies 15 are slightly larger than the outside diameter of the shaft 20 to provide a sliding fit therebetween to permit axial movement of the shaft 15 therein.

Figure 3:
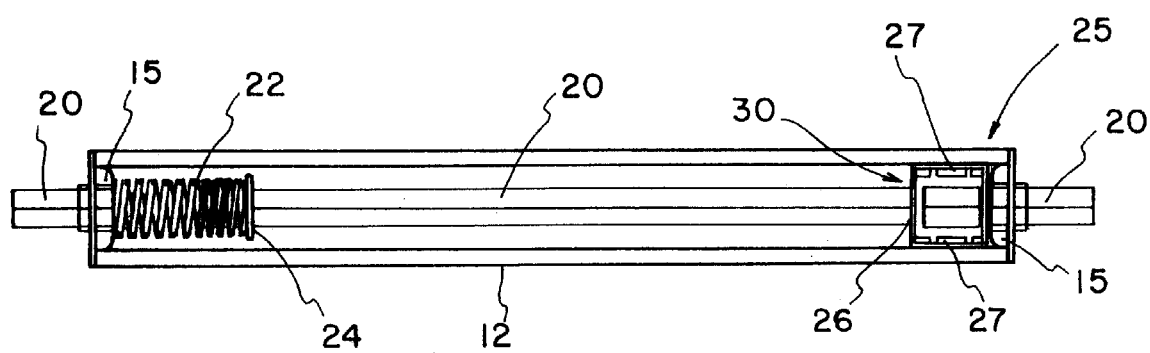
FIG. 3 is a partial sectional view taken through the cylindrical body member showing the arrangement of the internal components thereof.

Referring now to FIG. 3, a compression spring 22 is radially disposed about the shaft 20 at one end thereof adjacent the inner face of a bearing assembly 15. A shaft pin 24 is inserted through an aperture (not shown) drilled in perpendicular relation to an axis of the shaft to retain the spring 22 in position.

A second shaft pin 24 (not shown) is installed through the shaft 20 adjacent the bearing assembly 15 at the opposite end of body member 12 and functions as a stop to permanently capture the shaft 20 within the body member 12.

In this arrangement it will be appreciated that the shaft 20 is capable of being retracted inwardly against the pressure of the spring 22 to facilitate installation of the roller 10 in the conveyor track (not shown).

Still referring to FIG. 3 a braking assembly, indicated generally at 25, is radially disposed about shaft 20 and contained within the tubular member 12 at the end opposite spring 22. In the preferred embodiment, the braking assembly 25 comprises a roller clutch bearing 30 which permits the body member 12 to rotate in one direction only about the shaft 20 and prevents rotation in the opposite direction.

The roller clutch bearing 30 typically includes springs (not shown) integrally molded with the bearing cage 26 to position the roller elements 27 for instantaneous lockup when the body member 12 is rotated relative to the shaft 20 in a predetermined direction.

Since such roller clutch and bearing assemblies are well known to those skilled in the art, further detailed discussion of the same is not deemed necessary.

Thus, in an assembly procedure of the present conveyor roller, the roller clutch bearing 30 is positioned on the shaft 20 to permit rotation in the desired direction.

Next, a bearing assembly 15 is installed in a first end of the tubular member 12 and the shaft 20 together with the braking assembly 25 and the spring 22 is inserted through the tubular body member 12 and into the center opening 19 of the installed bearing.

Thereafter, the opposite bearing assembly 15 is installed into the tubular member 12 at an opposite end thereof to permanently capture the shaft 20 therein.

Next, the assembled conveyor rollers 10 is installed in the desired position such as on an inclined portion of the conveyor system track to prevent items being conveyed thereon from rolling backwards.

From the above it can be seen that the unidirectional conveyor rollers or One Way Roller of the present invention provides a conveyor roller that carries a braking assembly internally of the roller body, which permits rotation in only one direction.

The present conveyor roller is rotatably mounted on an elongated retractable shaft for simple installation in the conveyor track.

The terms "inner", "outer", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An improved conveyor roller of the type having a cylindrical body member radially disposed about an elongated shaft by means of ball bearing assemblies installed at either counterbored end of said body member in coaxial relation, said improvements comprising:

an internal braking means radially disposed about said shaft and residing within said body member, said braking means permitting rotation of said body member about said shaft in only one direction, said braking means including a roller clutch bearing assembly position within said body member in coaxial relation about said shaft at one end thereof, said roller clutch bearing including a plurality of roller elements engaging said shaft to provide instantaneous lockup of said body member whenever said body member is rotated in a predetermined direction; and spring biasing means carried within said body member enabling said shaft to be retracted into said body member to facilitate installation of said roller in a roller conveyor system.

2. The improved conveyor roller of claim 1 wherein said spring biasing means further includes a compression spring radially disposed about said shaft and being permanently captured thereon by a stopping means extending through said shaft such that said shaft can be retracted into said body member against the force of said compression spring and thereafter released to its extended position by the expansion force of said compression spring.

3. The improved conveyor roller of claim 1 wherein said body member is constructed from formed steel tubing.

4. The improved conveyor roller of claim 3 wherein said shaft is constructed from steel stock having a hexagonal cross-section.

5. The improved conveyor roller of claim 3 wherein said shaft is constructed from formed steel having a round cross-section.

6. A unidirectional conveyor roller for use in a pre-existing conveyor roller system comprising:

a cylindrical body member having a central bore extending therethrough and being counterbored at both ends thereof;

an elongated shaft disposed within said bore in coaxial relation thereto;

a plurality of ball bearing assemblies each having a concentric bore and being radially disposed abut said shaft in coaxial relation thereto, said bearing assemblies being permanently installed within said counterbored ends such that said body member is rotatable about said shaft; and a braking means residing within said body member and being radially disposed about said shaft, said braking means permitting free rotation of said body member about said shaft in one direction only and preventing rotation of said body member about said shaft in an opposite direction, said braking means including a roller clutch bearing installed to a press fit condition within said body member and engaging said shaft whenever said body member is rotated relative to said shaft in said one direction.

* * * * *